(12) United States Patent
Cullen

(10) Patent No.: US 12,246,360 B2
(45) Date of Patent: Mar. 11, 2025

(54) ENCLOSED WASH SYSTEM

(71) Applicant: Glen Cullen, Smithers (CA)

(72) Inventor: Glen Cullen, Smithers (CA)

( * ) Notice: Subject to any disclaimer, the term of this patent is extended or adjusted under 35 U.S.C. 154(b) by 0 days.

(21) Appl. No.: 18/082,443

(22) Filed: Dec. 15, 2022

(65) Prior Publication Data

US 2023/0182179 A1    Jun. 15, 2023

(51) Int. Cl.
| | | |
|---|---|---|
| *B08B 3/02* | (2006.01) | |
| *B08B 5/02* | (2006.01) | |
| *B60S 1/66* | (2006.01) | |
| *B05B 1/20* | (2006.01) | |
| *B05B 9/04* | (2006.01) | |
| *B05B 15/68* | (2018.01) | |
| *B60S 1/64* | (2006.01) | |

(52) U.S. Cl.
CPC .................. *B08B 3/02* (2013.01); *B08B 5/02* (2013.01); *B60S 1/66* (2013.01); *B05B 1/202* (2013.01); *B05B 9/0423* (2013.01); *B05B 15/68* (2018.02); *B08B 3/026* (2013.01); *B08B 2203/0247* (2013.01); *B60S 1/64* (2013.01)

(58) Field of Classification Search
CPC ..... B08B 3/02; B08B 5/02; B08B 2203/0247; B08B 3/026; B60S 1/66; B60S 1/64; B05B 1/202; B05B 15/68; B05B 9/0423
See application file for complete search history.

(56) References Cited

U.S. PATENT DOCUMENTS

| | | | | |
|---|---|---|---|---|
| 2,751,882 A | * | 6/1956 | Coyner ..................... | B60P 3/04 62/304 |
| 5,140,719 A | * | 8/1992 | Cowan ..................... | B60S 1/56 15/313 |
| 5,924,478 A | * | 7/1999 | Crocker ................... | F28G 9/00 165/95 |
| 2004/0110548 A1 | * | 6/2004 | Pope ......................... | B08B 5/02 460/115 |

(Continued)

OTHER PUBLICATIONS

AFEX Fire Suppression Systems, Liquid Chemical Systems, available at least as early as Sep. 18, 2021, retrieved Oct. 30, 2023, 9 pages.

(Continued)

*Primary Examiner* — Benjamin L Osterhout
(74) *Attorney, Agent, or Firm* — Robert A. Nissen

(57) ABSTRACT

This system was designed to resolve dirt and dust accumulation in confined areas on mobile and stationary equipment, and other types of plant equipment, including equipment of offshore oil and gas platforms, maritime vessels, and others, and more generally any kind of motorized or mechanical equipment with internal areas that accumulate dust and dirt. The areas where dust and dirt accumulation occur would normally only be accessible by removing major components. The system may be designed to utilize existing pressure washers and air systems. The supply manifold may be constructed from steel, hydraulic lines, pressure wash nozzles and angled fittings. The installer may assess areas of accumulation, directing the nozzles at the general area. Once (Continued)

the system has been installed, mechanical operators may easily attach the device to a pressure source. Quick connect fittings would be installed outside the machine, connecting pressurized water or air to the supply manifold.

20 Claims, 8 Drawing Sheets

(56) References Cited

U.S. PATENT DOCUMENTS

| | | | |
|---|---|---|---|
| 2007/0169796 A1* | 7/2007 | Johnson | B08B 3/026 134/123 |
| 2014/0034092 A1* | 2/2014 | Dorshimer | F01D 25/002 134/171 |
| 2014/0144151 A1* | 5/2014 | Bifulco | F04D 29/705 29/888.011 |
| 2019/0031155 A1* | 1/2019 | Mizuno | B08B 3/08 |
| 2019/0202412 A1* | 7/2019 | Jacobson | A61L 2/22 |
| 2020/0386146 A1* | 12/2020 | Andrios | F01P 1/02 |

OTHER PUBLICATIONS

ESD Waste2water, Inc., Powerful Water Cannons, available at least as early as Jan. 27, 2021, retrieved Oct. 30, 2023 from https://web.archive.org/web/20210127014208/https://www.waste2water.com/wp-content/uploads/2020/05/Water-Cannon-Cut-Sheet.pdf, 2 pages.
ESD Waste2water Inc., Solids Management System (SMS), available Feb. 10, 2016, retrieved from https://www.youtube.com/watch?v =_aZbQSEpdxk&t=1s, 2 pages.

* cited by examiner

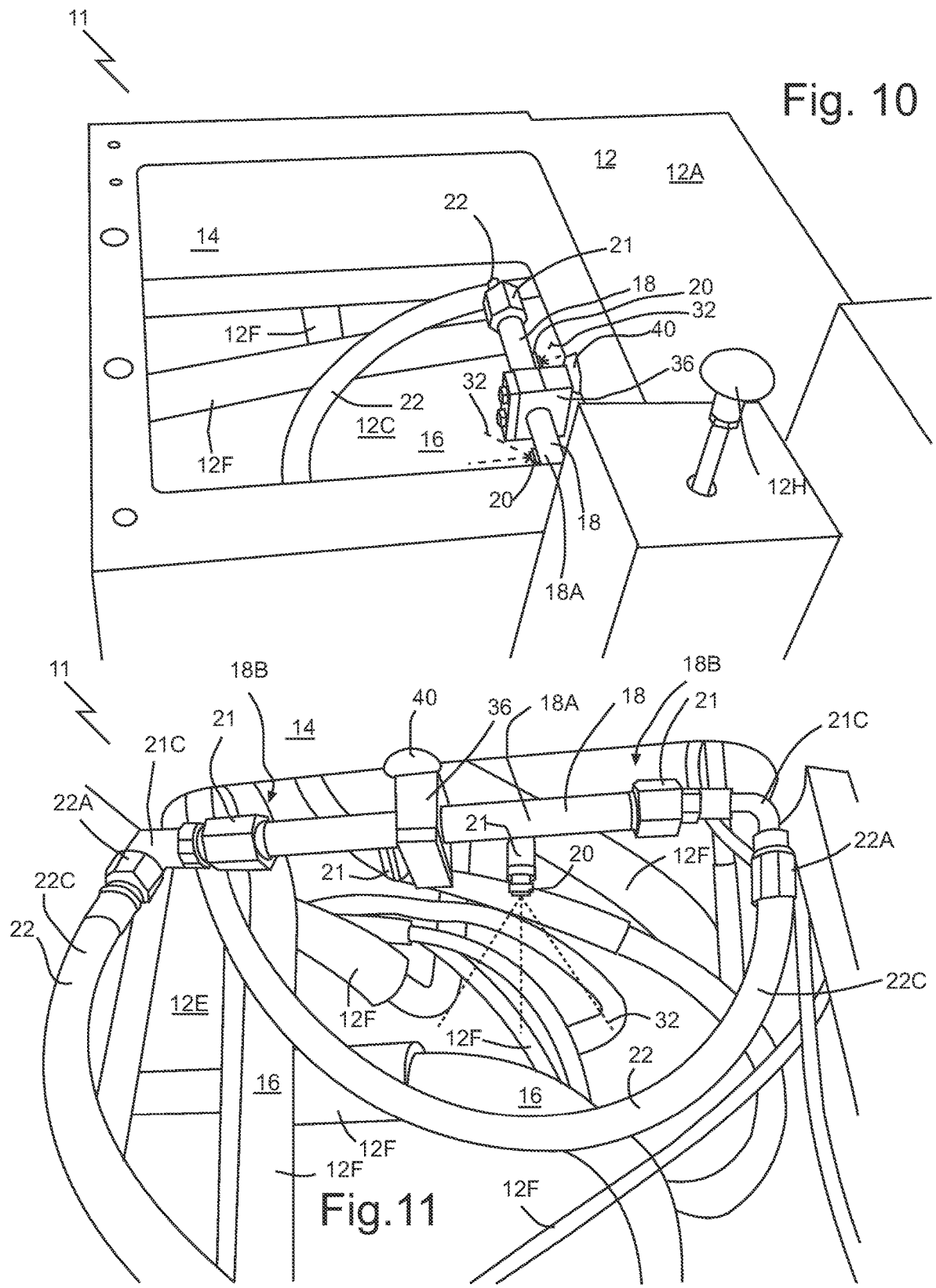

ENCLOSED WASH SYSTEM

TECHNICAL FIELD

This document discusses systems designed to obviate and reduce sawdust, dirt and other accumulations in enclosed areas on mobile equipment. This disclosure relates to a system designed to reduce contaminant accumulation on mobile equipment, specifically in enclosed areas, such as under the cab of the equipment, in enclosed panel areas, or other areas of the equipment, which might be hard to access without removing guarding.

BACKGROUND

The following paragraphs are not an admission that anything discussed in them is prior art or part of the knowledge of persons skilled in the art. Currently, with mobile equipment, easy-to-access areas may be relatively easily monitored and maintained. Unfortunately, it is difficult to maintain and clean enclosed areas on mobile equipment. Dust and other organic materials can accumulate, posing a fire hazard. The time it takes to remove and inspect these enclosed areas is not feasible for some operations.

SUMMARY

The enclosed mobile wash systems disclosed herein would remediate the above concerns. The systems here may be used on mobile and stationary equipment, and other types of plant equipment, including equipment of offshore oil and gas platforms, maritime vessels, and others, and more generally any kind of motorized or mechanical equipment with internal areas that accumulate dust and dirt.

A wash system designed for enclosed areas on mobile equipment is disclosed. The system may reduce dust/dirt and other accumulation around enclosed areas. The system when installed, may target areas that would only be accessible by removing panels, seats or other major components.

A washing manifold, stainless steel or black pipe, may be installed on enclosed/confine spaces on mobile/heavy duty equipment, to eliminate dirt, dust and another contaminant buildup. Pressure washer nozzles may be installed on the manifold, for example running parallel or in series. The system may be supplied water or air, depending on the consumer's preference.

Nozzle size may vary, pending on pressure washer being used. Nozzle size may be matched with pump rate, for example gallons per minute (GPM), to achieve desired pressure.

The system may be used in conjunction with a pressure washer and/or air supply. The system may be used with pressure washers and/or air, and may be adaptable for winter and summer conditions. The system is designed to reduce fire risk, while reducing maintenance costs.

An apparatus is disclosed comprising: mobile equipment that defines an enclosed area in which one more of dirt, dust, and contaminants accumulate during use; a manifold mounted in the enclosed area; a plurality of pressure washer nozzles that are connected to the manifold and each directed to spray washer fluid to dislodge dirt, dust, and contaminants that has accumulated in the enclosed area during use; and a high-pressure washer fluid supply line connected to the manifold.

A method is disclosed comprising supplying high-pressure washer fluid to a high-pressure washer fluid supply line mounted to mobile equipment, in which the high-pressure supply line is connected to a manifold, which mounts a plurality of pressure washer nozzles located within an enclosed area of the mobile equipment, such that the high-pressure washer fluid is ejected from the plurality of pressure washer nozzles to dislodge dirt, dust, and contaminants that have accumulated in the enclosed area during use.

A wash system for mobile equipment is disclosed comprising: a manifold; a plurality of pressure washer nozzles; a high-pressure washer fluid supply line; and a quick-connect fitting on the high-pressure supply line for connection to an external washer fluid supply; in which the manifold and plurality of pressure washer nozzles comprise enclosed area mounting parts and are structured to mount within an enclosed area of the mobile equipment where dirt, dust, and contaminants accumulate during use of the mobile equipment.

An enclosed mobile wash system may comprise multiple washing manifolds, for example comprising metal such as stainless steel, grade 304, 316SS, 40SS, 326 and black pipe grade A or grade 8, and for example comprising metal nozzles such as stainless steel washing nozzles (which may vary in size to match pump GPM). The nozzles may be matched based on required outlet pressure, for example varying from number 2-6 nozzle size, 4 wire high pressure supply lines and a high pressure quick connect. The manifolds, nozzles and high-pressure lines may vary in size and length. This may allow the system to be installed on a variety of equipment, fabricated to meet the requested requirements.

Enclosed panels may be removed on mobile units, providing a user with access for installation. During installation, the manifold may be mounted and secured in a suitable fashion such as with one or more of tube clamps, bolts or welding, into place. High-pressure nozzles may be directed at areas of dirt, dust and other material accumulation. The orientation of each nozzle may be adjustable to target certain areas as desired. The supply line may be routed, mounted and secured with tube clamps or other suitable mechanisms.

The initial operation may comprise the following stages. An operator may install a supply line to a quick connect fitting. Once installed and the pressure washer/air system is actuated, pressurized water or air enters the manifold. The water/air may then be directed through the manifold, exiting the high-pressure nozzles. Water/air targets and sprays the areas of accumulation, removing accumulation.

The disclosed systems were designed after many years of trying to resolve dirt and dust accumulation in confined areas on loaders and forklifts. Various areas where dust and dirt accumulation occur within mobile equipment are normally only accessible by removing major components. Initial installation may be time consuming, however, once completed may eliminate future risk exposure and manning. The system was designed to utilize existing pressure washers and air systems. The supply manifold may be constructed from metal (such as steel), hydraulic lines, pressure wash nozzles and angled fittings. The installer may assess areas of accumulation, installing the system and directing the nozzles at the general areas that accumulate dirt, debris, and contaminants. Once the system has been installed, an operator of mechanics may easily attach the device to an external washer fluid supply. Quick connect fittings may be installed outside the machine, connecting pressurized water or air to the supply manifold(s).

An apparatus is also disclosed comprising: equipment that defines an enclosed area in which one more of dirt, dust, and contaminants accumulate during use; a manifold mounted in the enclosed area; a plurality of pressure washer nozzles that are connected to the manifold and each directed to spray washer fluid to dislodge dirt, dust, and contaminants that has accumulated in the enclosed area during use; and a high-pressure washer fluid supply connector. The connector may be on a high-pressure washer fluid supply line connected to the manifold.

A wash system for equipment is disclosed comprising: a manifold; a plurality of pressure washer nozzles; and a quick-connect fitting for connection to an external washer fluid supply; in which the manifold and plurality of pressure washer nozzles comprise enclosed area mounting parts and are structured to mount within an enclosed area of the equipment where dirt, dust, and contaminants accumulate during use of the equipment. The connector may be on a high-pressure washer fluid supply line connected to the manifold.

The systems here may be used on mobile and stationary equipment, and other types of plant or facility equipment, including equipment of offshore oil and gas platforms, maritime vessels, wood-processing facilities and saw mills, industrial, commercial, and residential facilities, and others, including computer systems, and more generally any kind of motorized or mechanical equipment with internal areas that accumulate dust and dirt. The connector may be on a high-pressure washer fluid supply line connected to the manifold.

In various embodiments, there may be included any one or more of the following features: A pump connected to supply washer fluid to the high-pressure washer fluid supply line. A washer fluid supply connected to the high-pressure washer fluid supply line. The washer fluid supply is external to the mobile equipment. The washer fluid supply comprises water or air. The high-pressure supply line has a washer fluid supply connector. The washer fluid supply connector comprises a quick-connect fitting. The washer fluid supply connector is mounted to the mobile equipment external to the mobile equipment. The supply of fluid passes through a filter, such as a high pressure filter, before entering the manifold. The nozzles may be rotary or rotating nozzles. The manifold is connected to the enclosed area using magnets. The high-pressure washer fluid supply line comprises a fluid filter. The manifold is connected to supply washer fluid to the plurality of pressure washer nozzles in parallel or in series. A plurality of manifolds, each having a plurality of pressure washer nozzles, and each connected to the high-pressure supply line. The mobile equipment defines a plurality of enclosed areas; and each of the plurality of enclosed areas contains one or more of the plurality of manifolds and respective plurality of pressure washer nozzles. The enclosed area is accessible by one or more of guarding, panels, or seats. The mobile equipment comprises a loader or lifter. One or more of the manifold, the plurality of pressure washer nozzles, and the high-pressure supply line comprise metal. The manifold is connected to the enclosed area using tube clamps. Prior to supplying the high-pressure washer fluid, connecting the high-pressure supply line to a washer fluid supply that is external to the mobile equipment. After supplying the high-pressure washer fluid, disconnecting the high-pressure supply line from the washer fluid supply. Prior to supplying the high-pressure washer fluid, installing the manifold and plurality of pressure washer nozzles within the enclosed area.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIG. 10 is a perspective view of a manifold assembly of a mobile wash system installed in an enclosed area, namely a compartment that is located below a seat of the mobile equipment, with the seat removed to expose the enclosed area.

FIG. 11 is a perspective view of the manifold assembly from FIG. 10 in greater detail, with the cab seat removed.

DETAILED DESCRIPTION

Figure 1:
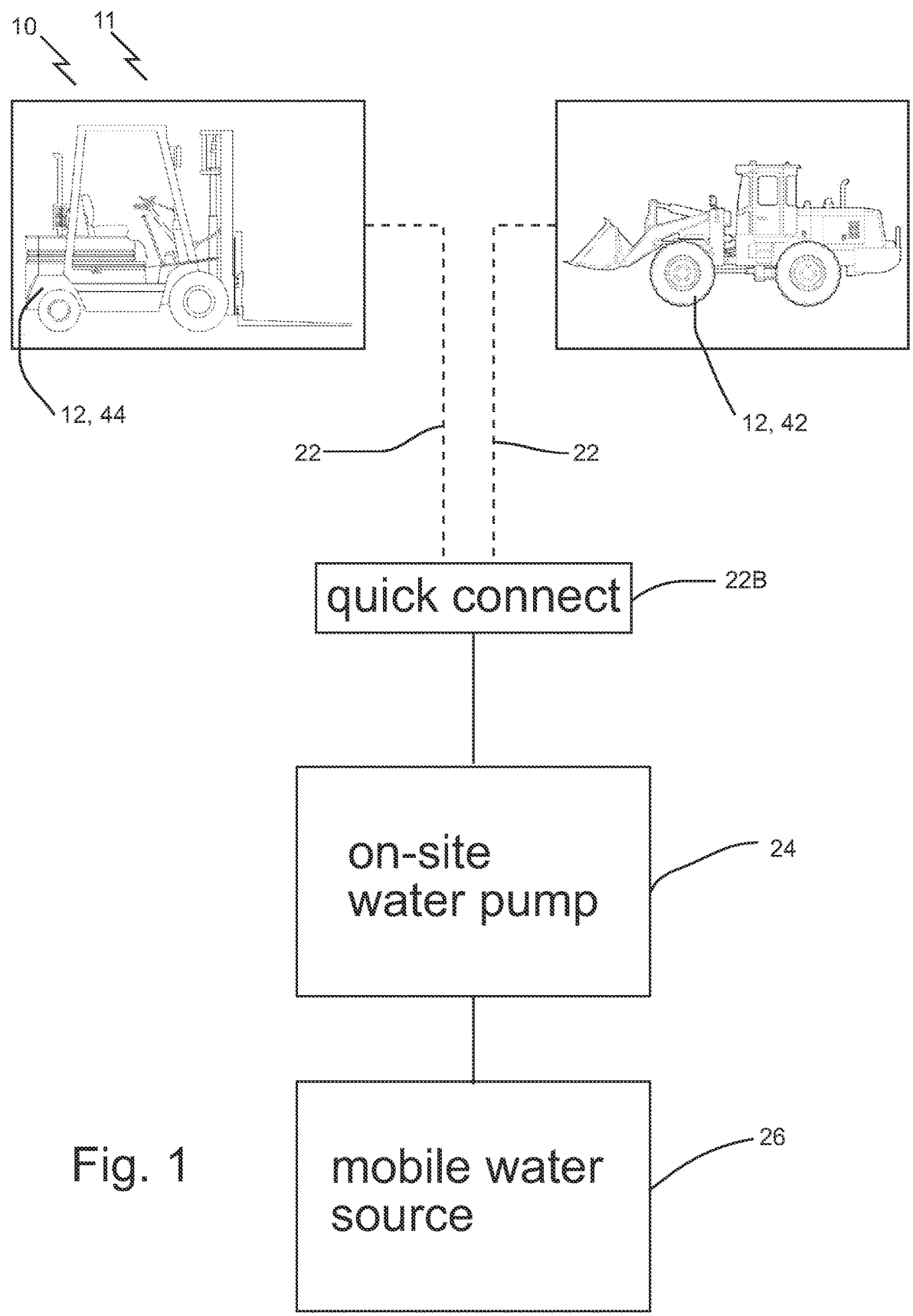
FIG. 1 is a schematic representation of an enclosed mobile wash system.
Figure 2:
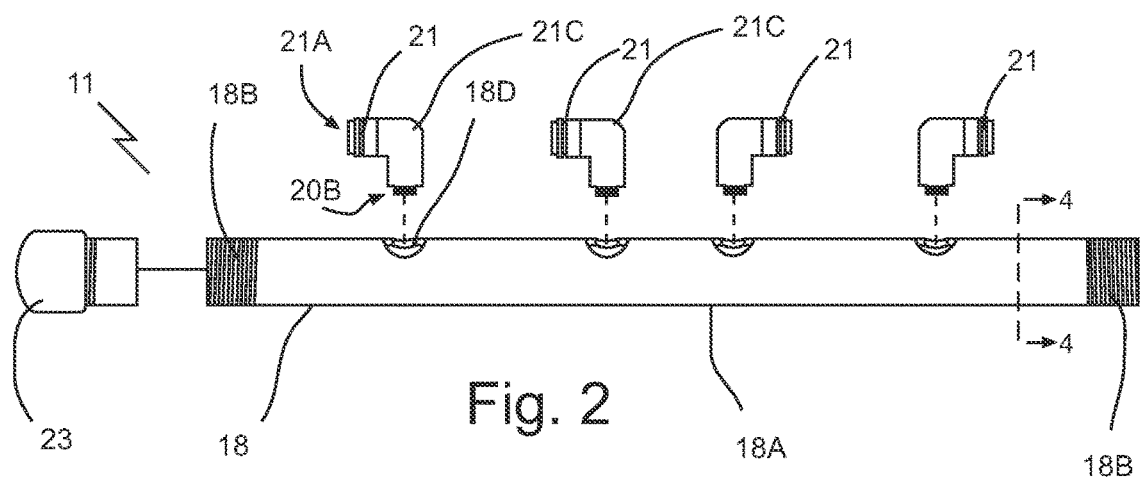
FIG. 2 is an exploded view of an enclosed mobile wash system, made of a manifold, nozzles, and fittings.
Figure 3:
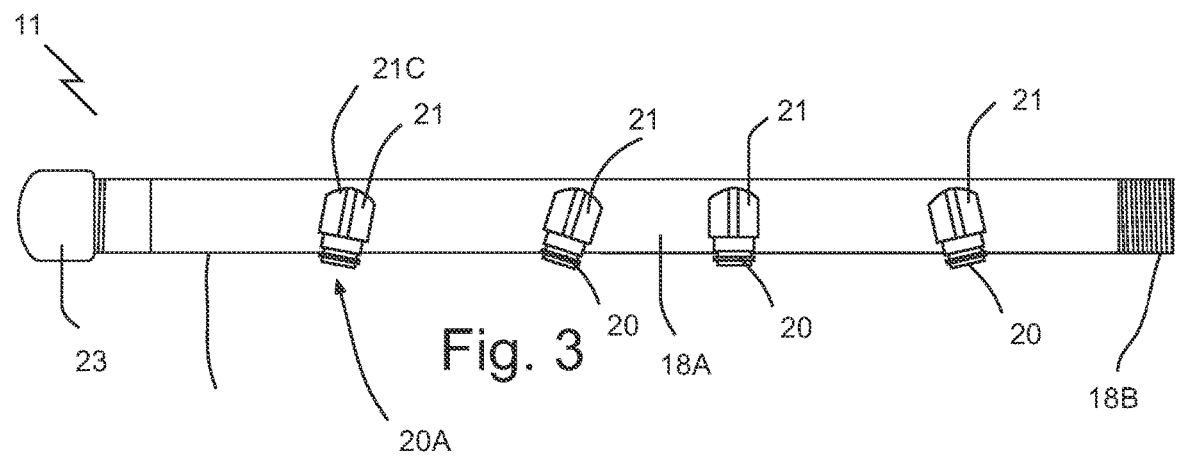
FIG. 3 is a side elevation view of the manifold of FIG. 2 after assembly.
Figure 4:
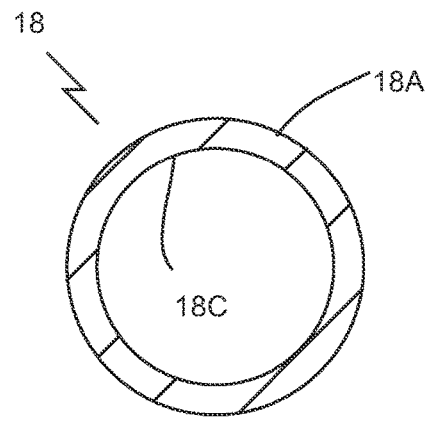
FIG. 4 is a cross sectional view taken along the 4-4 lines of FIG. 2.
Figure 5:
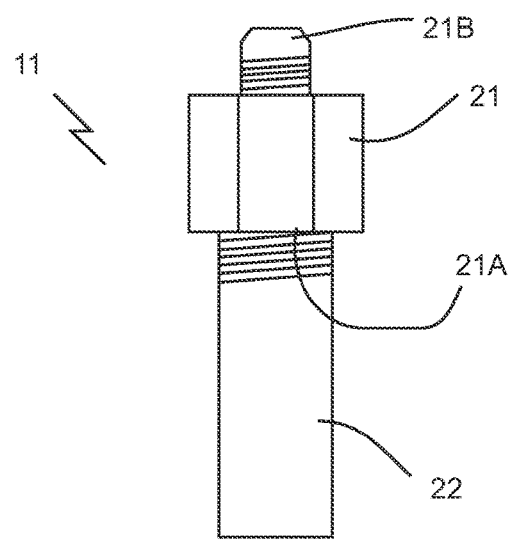
FIG. 5 is a side elevation view of a fitting for an end of the manifold of FIG. 2.
Figure 6:
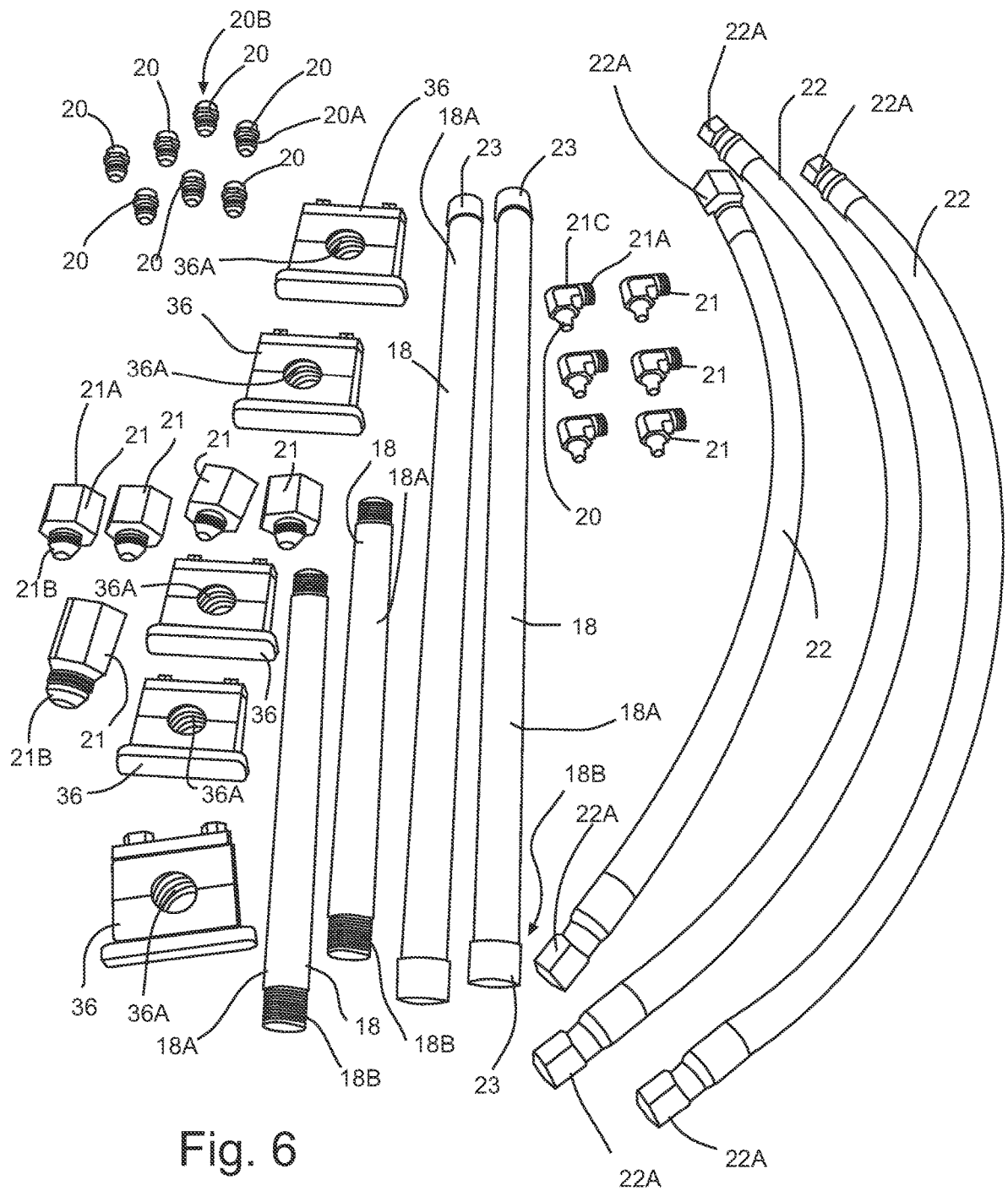
FIG. 6 is a perspective view of a kit of components for a mobile wash system.

Immaterial modifications may be made to the embodiments described here without departing from what is covered by the claims.

Mobile equipment includes machinery that is capable of moving on its own, whether by wheels, tracks, or rails. One of the most common types of mobile equipment is heavy duty machinery. Heavy duty machinery typically contains enclosed areas, which may house diesel engines, hydraulic lines, and other components essential for operation. Since mobile equipment and heavy-duty machinery are often operating in undeveloped areas, such as construction sites and oilfield leases, they are prone to becoming quite dirty, whether by accumulation of mud, soot, dust, grasses, sawdust, or other contaminants. Keeping the enclosed areas of heavy-duty equipment clean may be difficult, but may be essential to prolong the lifespan of the equipment and reduce the risks of fires.

Referring to FIGS. 1-15, a wash system 10 for mobile equipment 12 is disclosed. The wash system 10 may have a manifold 18, a plurality of pressure washer nozzles 20, and a high-pressure washer fluid supply line 22. The system 10 may form part of an apparatus 11 comprising mobile equipment 12 which may define an enclosed area 14. The manifold 18 may be mounted in the enclosed area 14 of the mobile equipment. The plurality of pressure washer nozzles 20 may be connected to the manifold 18 and each may be directed to spray washer fluid 32. The high-pressure supply line 22 may be connected to supply the manifold 18. The high-pressure supply line 22 may comprise a washer fluid supply connector 22B, such as a quick-connect fitting for connection to an external washer fluid supply 26 (a supply 26 that is not mounted to the mobile equipment and is external to the mobile equipment). The mobile equipment 12 may be motorized and able to move independently, for example, the mobile equipment 12 may comprise a loader or lifter. The enclosed area that is targeted for assembly of the system 10 may be one where one more of dirt, dust, and contaminants 16 may accumulate in during use of the mobile equipment 12. High-pressure washer fluid may be supplied to the high-pressure supply line 22, which may be mounted to mobile equipment 12. The high-pressure supply line or lines 22 may comprise suitable materials, for example referring to FIG. 11, the hose used in the example is a 6000 psi rated 12.7 mm diameter GH493-8 from Eaton™ serial number EN856 R12/100R12. Referring to FIGS. 1-13, the high-pressure supply line or lines 22 may be connected to the manifold or manifolds 18, such that high-pressure washer fluid is ejected from each set of plurality of pressure washer nozzles 20 to dislodge dirt, dust, and contaminants 16 that have accumulated in the enclosed area 14 during use of the mobile equipment 12. One or more of the manifold 18, plurality of pressure washer nozzles 20, and high-pressure supply line 22 may comprise or be formed of metal. The enclosed area 14 may be accessible through removing one or more of guarding 28, panels 30, or seats (not shown). The enclosed areas selected for assembly may ones whose manual cleaning without use of system 10 may be otherwise time consuming, costly and inefficient.

Referring to FIGS. 2-6 and 11, the manifold 18 may comprise suitable structure and parts. The manifold 18 may comprise a tube body 18A, which may define threaded ends 18B, an internal bore 18C and nozzle mounting apertures 18D. The threaded ends 18B of the manifold 18 may connect to a high-pressure supply line 22 or a pipe cap 23. The high-pressure supply line 22 may supply washer fluid to the internal bore 18C of the manifold 18. The threaded end 20B of plurality of pressure washer nozzles 20 may connect to the nozzle mounting apertures 18D of the manifold 18. Apertures 18D may be drilled out of a metal tube to form the manifold 18. The nozzle mounting apertures 18D of the manifold 18 may be a suitable size, for example 7/32 inches. The threaded ends 18B and 20B of the manifold 18 and the pressure washer nozzles 20, respectively, may comprise Teflon or other sealing tape or adhesive on the threaded connections. The washer fluid may move through the internal bore 18C of the manifold to the nozzle mounting apertures 18D, allowing the washer fluid to be spray out of a spray end 20A of the plurality of pressure washer nozzles 20 toward targeted areas within the enclosed areas 14. The pressure washer nozzles 20 may be connected to or form part of an angled fitting 21C, which may allow the washer fluid to be directed out of the spray end 20A towards a selected portion of the enclosed area 14. Other fittings 21 may be used to connect various lines 22, nozzles 21, and manifolds 18 together, in any configuration, for example in parallel or series or both orientations. The pressure washer nozzles 20 may comprise suitable dimensions and orientations, such as ¼" male to female pipe sections angled at 0, 45, or 90 degrees. The nozzles may be suitable nozzles, including fixed and moving nozzles. Rotating nozzles/rotary nozzles are an example of a moving nozzle that uses centrifugal force to produce a strong impact and a spray pattern. Due to the reliability and effectiveness rotary turbo nozzles have been widely accepted in other fields. The nozzle rotates a powerful, zero degree spray pattern in a circular motion to break down tough dirt and grime.

Referring to FIG. 1, the apparatus 11 may comprise a washer fluid supply 26, for example a washer fluid supply 26 external to the mobile equipment 12. The apparatus 11 may comprise a pump 24 connected to supply washer fluid to the high-pressure supply line 22. The pump 24 may supply the washer fluid to the high-pressure supply line 22 from the external washer fluid supply 26 through a washer fluid supply connector 22B, such as a quick connect fitting. The system may be operated via the use of a valve (not shown). The washer fluid supply 26 may comprise water or air.

Figure 13:
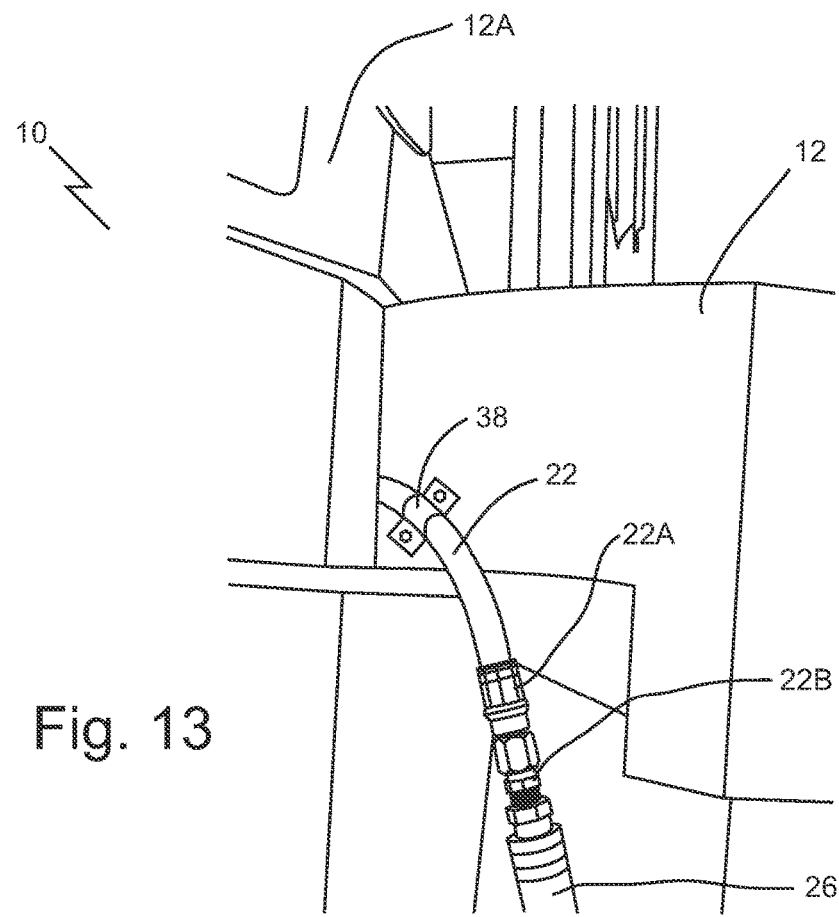
FIG. 13 is a perspective view of a quick connect of a supply line of the mobile wash system to connect the supply line to an external washer fluid supply.
Figure 14:
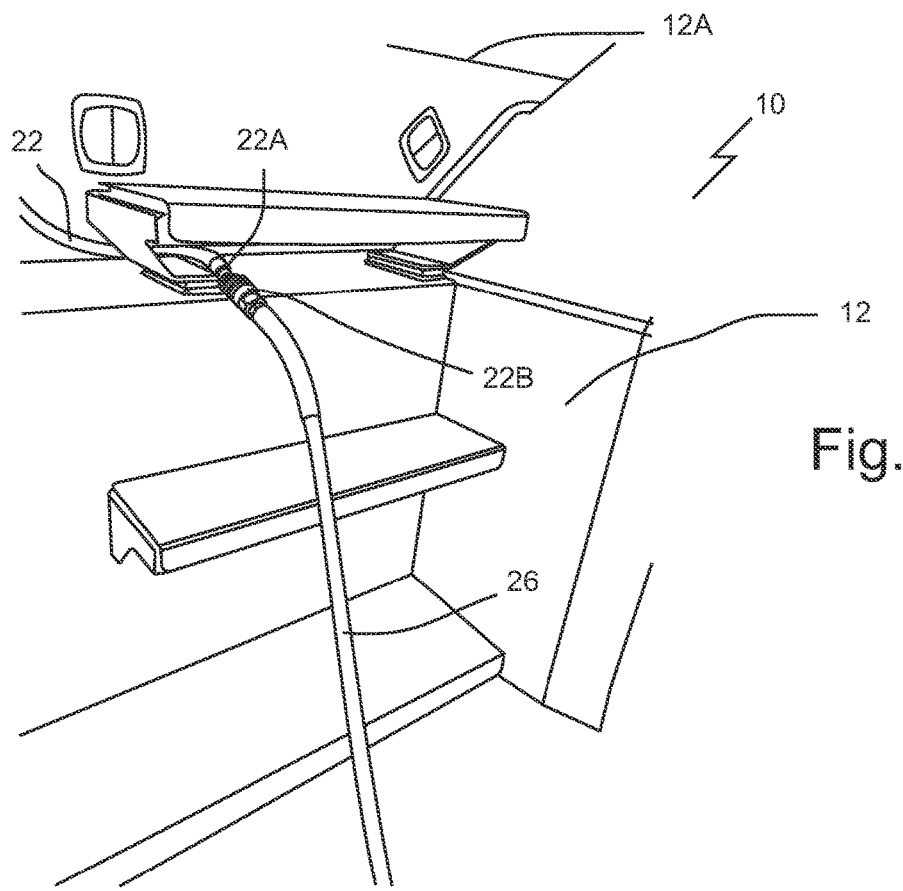
FIG. 14 is a perspective view of a quick connect of a supply line of the mobile wash system to connect the supply line to an external washer fluid supply.
Figure 15:
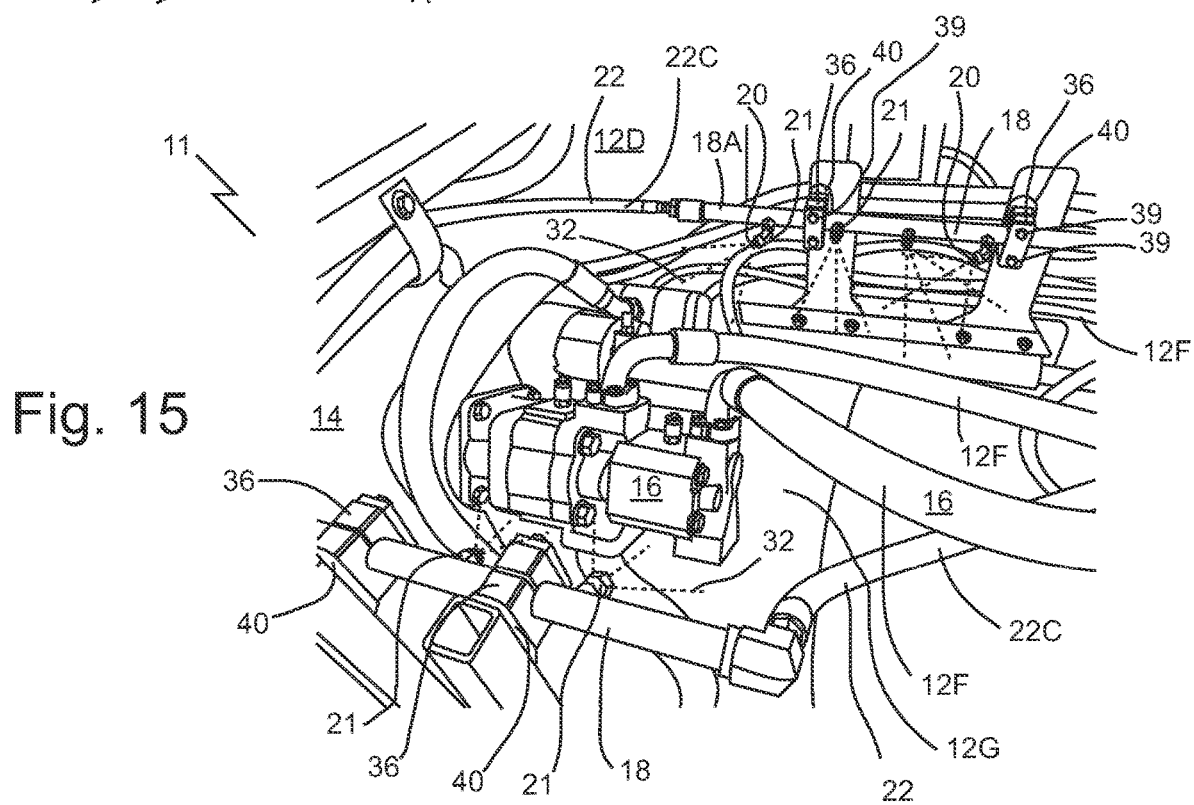
FIG. 15 is a perspective view of a manifold assembly of a mobile wash system installed in an enclosed area, namely a compartment an engine compartment of, the mobile equipment.

Referring to FIGS. 13 and 14, the high-pressure supply line 22 may define a washer fluid supply connector 22B, for example a quick-connect fitting. The washer fluid supply connector 22B of the high-pressure supply line 22 may have an external mount, such as if the line 22 terminates outside of the mobile equipment 12. Having the washer fluid supply connector 22B accessible from an exterior of the mobile equipment 12 may allow for the high-pressure supply line 22 to be conveniently connected to and disconnected from an external washer fluid supply 26. The washer fluid supply connector 22B may be secured to the exterior of the mobile equipment, for example through the use of a hose clamp 38, and may reduce the need to remove guarding 28, panels 30 or seats to access the apparatus 11. Operation of the wash system 10 may involve connecting the high-pressure supply line 22 to the washer fluid supply 26 located outside of the mobile equipment 12, supplying the fluid to the high-pressure supply line 22, and disconnecting the washer fluid supply connector 22B of the high-pressure supply line 22 from the washer fluid supply 26B.

Referring to FIGS. 6, 7, 8, 10-12, and 15 the high-pressure supply line 22 may be connected to supply water to the manifold 18. The manifold 18 may be connected to supply washer fluid from the high-pressure supply line 22 to the plurality of pressure washer nozzles 20, and to other lines 22 and manifolds 18, whether in parallel or in series. The washer fluid may pass through a high-pressure filter (not shown) before entering the manifold 18. The high-pressure supply line 22 may be connected to the manifold 18 at one or more of the threaded ends 18B through the use of a pipe fitting 21 for example a ¾" pipe to a joint industry council (JIC) connector. The pipe fitting 21 may connect to the threaded end 18B of the manifold through the use of a threaded end 21A, and to a high-pressure supply line 22 through the use of a barbed end 21B. The pipe fittings 21 used may comprise a suitable structure, such as a 90-degree fitting 21C. If the manifold 18 is at the end of a flow path through the equipment, then a pipe cap 23 is connected to the opposite threaded end 18B of the manifold 18. In other cases, one manifold 18 may feed other manifolds, for example in series, using fittings 21 and lines 22 between respective manifolds 18. The apparatus may comprise a plurality of manifolds 18 (FIG. 15), each manifold 18 having a plurality of pressure washer nozzles 20, and each manifold 18 may be connected to the high-pressure supply line 22. The mobile equipment 12 may define a plurality of enclosed areas 14 and each of the plurality of enclosed areas 14 may contain one or more of the plurality of manifolds 18 and respective plurality of pressure washer nozzles 20.

Figure 7:
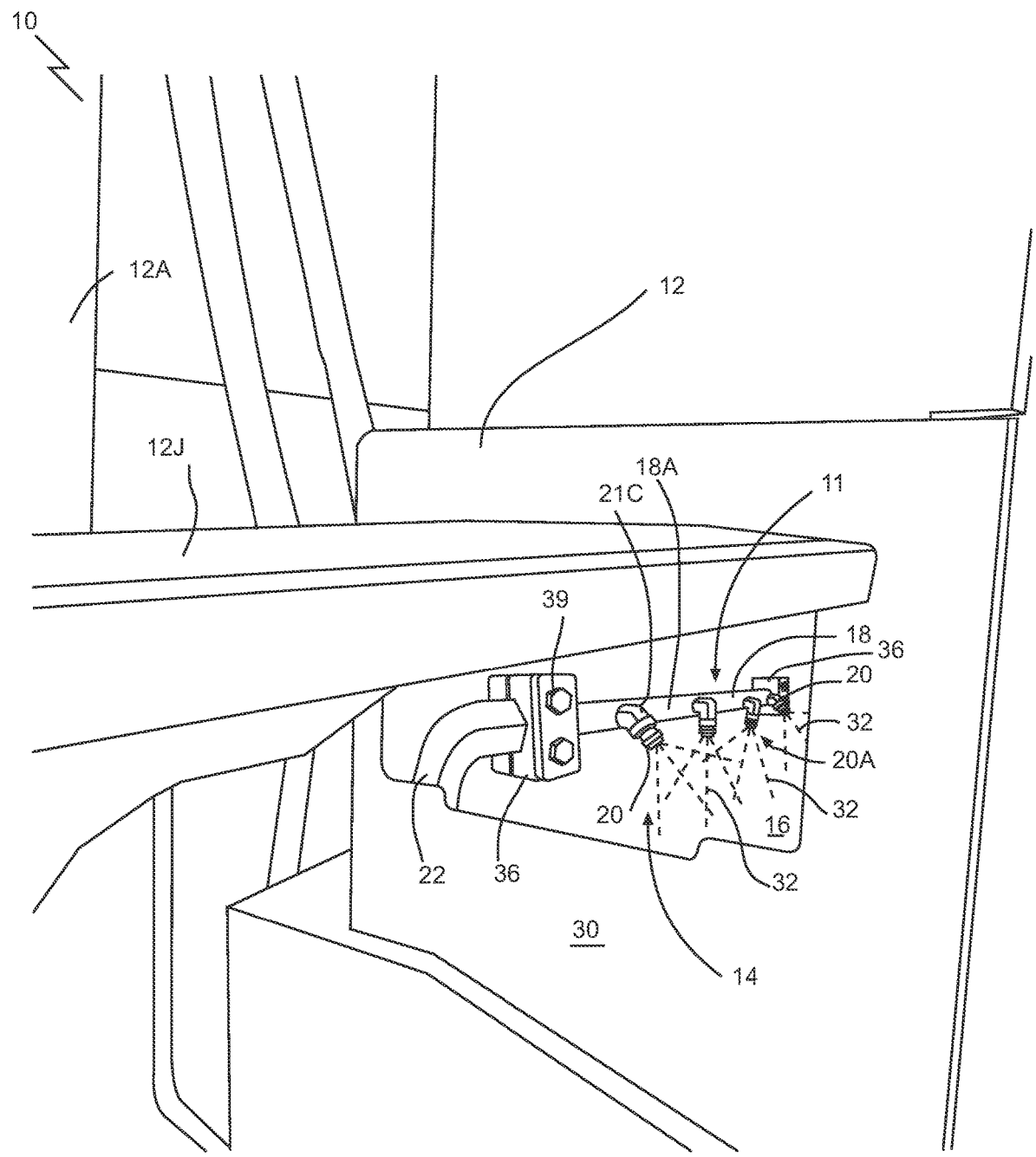
FIG. 7 is a perspective view of a mobile wash system installed on mobile equipment, in an enclosed compartment adjacent a step up to a doghouse of the mobile equipment.
Figure 8:
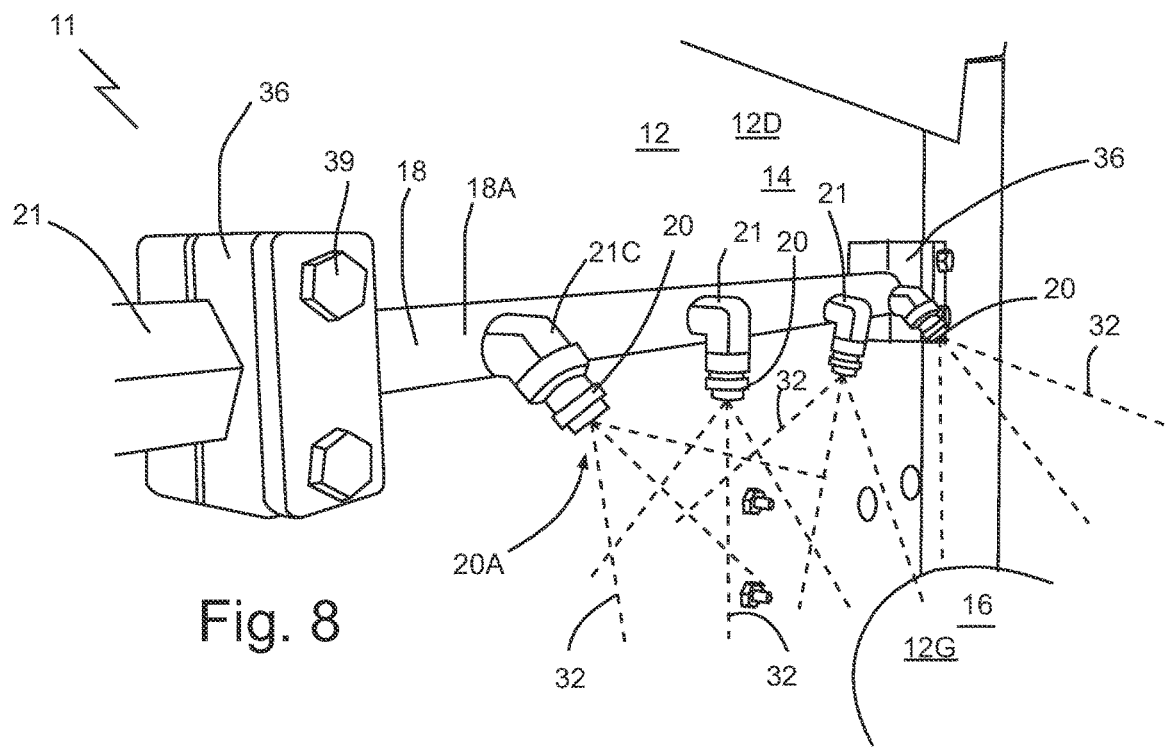
FIG. 8 is a perspective view of a manifold assembly of a mobile wash system installed in an enclosed area, namely an engine compartment, of mobile equipment.
Figure 9:
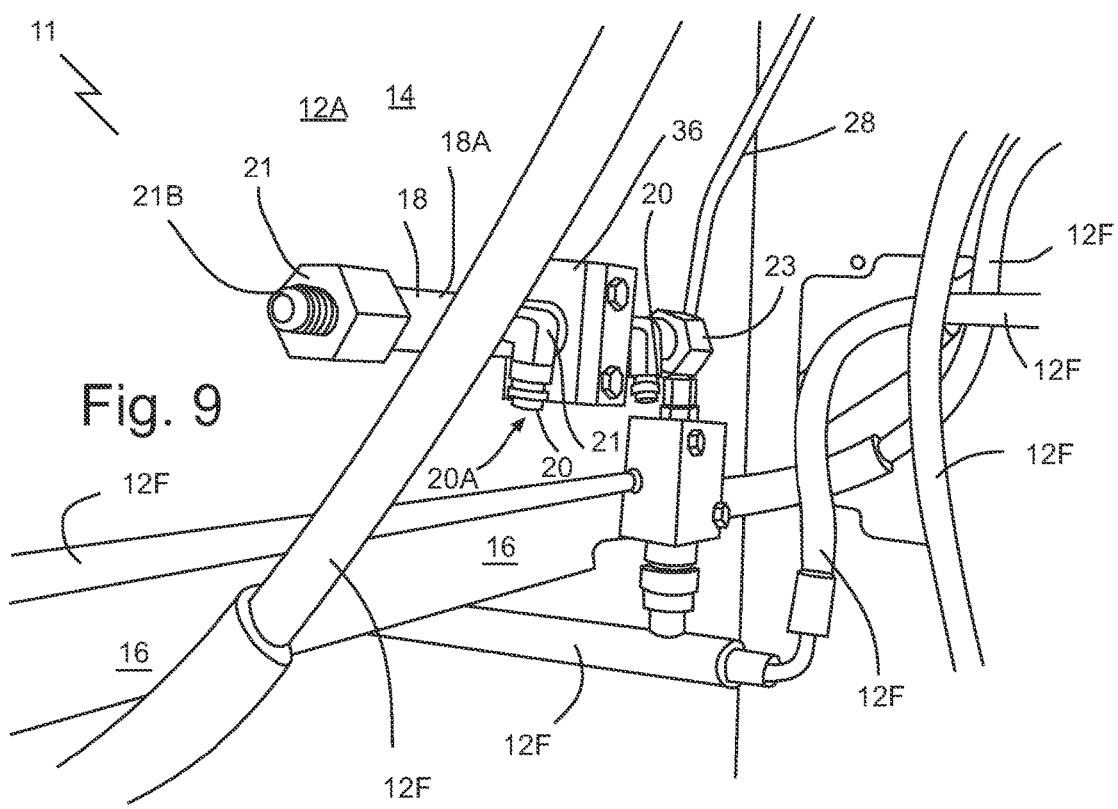
FIG. 9 is a perspective view of a manifold assembly of a mobile wash system installed in an enclosed area, namely a compartment in a doghouse of, the mobile equipment.
Figure 12:
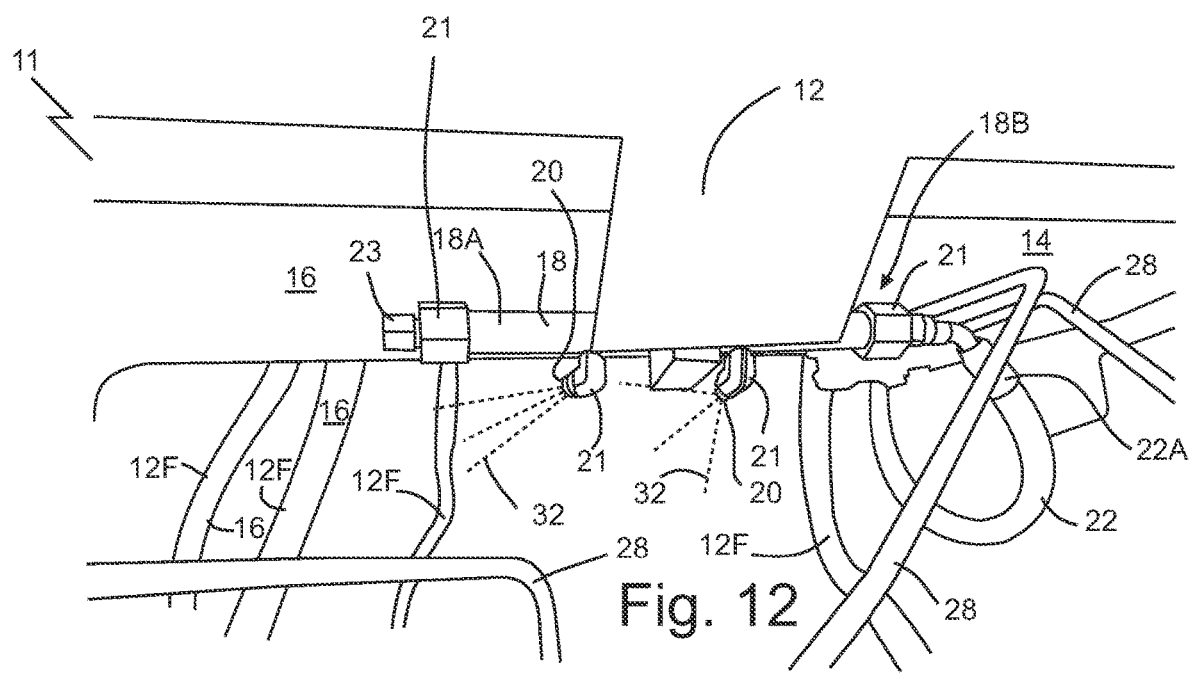
FIG. 12 is a perspective view of a mobile wash system of FIG. 9 installed in an enclosed area of mobile equipment.

Referring to FIGS. 7-12 and 15, the system 10 may be installed in various enclosed areas 14, for example areas 14 that may be difficult to access due to guarding 28, panels 30, and the structure of the mobile equipment 12. Referring to FIG. 7 the system 10 is shown installed in an enclosed compartment adjacent a step 12J up to a doghouse or cab 12A of the mobile equipment, with the cab 12A mounting various related components, such as controls 12H and a seat (not shown). Referring to FIG. 8 the system 10 is shown installed in an engine compartment 12D of the mobile equipment. Referring to FIG. 9 the system is illustrated as installed in a compartment in a doghouse or cab 12A of the mobile equipment. Referring to FIGS. 10 and 11 the system 10 is illustrated as being installed in a compartment or area 12C that is located below a seat of the mobile equipment, within a cab 12A of the equipment. The spray 32 from the spray end 20A of the pressure washer nozzles 20 may be used to dislodge dirt, dust, and contaminants 16 that have accumulated in the enclosed area 14 during use of the mobile equipment 12, such as various accumulations that occur on the hydraulic lines 12F for power use. the engine 12G of the mobile equipment 12, or on other areas.

Referring to FIGS. 6-12 and 15, the apparatus 11 may be installed within the enclosed area 14 of the mobile equipment 12 via suitable methods. Prior to supplying the high-pressure supply line 22 with washer fluid, the manifold 18 and plurality of pressure washer nozzles 20 may be installed within the enclosed area 14. The tube body 18A of the manifold 18 may be attached to the enclosed area 14 of the mobile equipment 12 via a suitable fashion, such as by using tube clamps 36, for example through the use of bolts 39, welds 40, traditional threaded metal fasteners, flexible fasteners, magnetic fasteners, and others. In one case, the manifold 18 or other parts of the system may be installed using magnets instead of or in support of other permanent mounting techniques, for one or more of a variety of purposes, for example to facilitate installation, to allow a user more flexibility in placement of or re-positioning of the nozzles, or to avoid or reduce the amount of physical modification of the structure required to install the system and/or clamping parts, as any such modification, for example by welding, cutting, or drilling, may otherwise potentially compromise the strength or structural integrity of the structure. In one example of a magnet connection, a base part of a tube clamp 36 may comprise a magnet that directly or indirectly mounts to a metal part of or secured to the surrounding structure of the enclosed area. A tube clamp 36 may define a passage 36A, which may be sized or selected to allow the tube body 18A to pass through and be gripped and held within the tube clamp 36 once secured. A length of the tube body 18A of the manifold 18 may be selected to fit the size of the enclosed area 14. Suitable hose sizes may be used, for example, ¾" inch piping may be used at 12" or 24" or other lengths. A plurality of tube clamps 36 may be used when the length of the tube body 18A of the manifold 18 requires multiple tube clamps 36 to be properly secured to the mobile equipment 12. The apparatus 11 may comprise or be formed of a suitable material, for example various metals, polymer plastics, nylon and/or other types of non-metal components.

Referring to Tables 1 and 2 below, a desired fluid pressure may be set by varying various structural characteristics of apparatus 11. Fluid pressure may be measured in pounds per square inch (PSI), and may be varied by changing the gallons per minute (GPM) of the pump, the size of the nozzle orifice of the spray end 20A of the pressure washer nozzle 20.

TABLE 1

| | | Quantity of Nozzles/Pressure in psi: | | | |
|---|---|---|---|---|---|
| | Size | 2 Nozzles | 3 Nozzles | 4 Nozzles | 5 Nozzles |
| 4 GPM | 2 | 4000 | 1800 | 1000 | 700 |
| | 2.5 | 2200 | 1000 | 600 | — |
| | 3 | 1900 | 750 | — | — |
| | 4 | 1000 | — | — | — |
| 5 GPM | 2 | — | 2800 | 1600 | 1000 |
| | 2.5 | 4000 | 1600 | 900 | 600 |
| | 3 | 2700 | 1300 | 600 | — |
| | 4 | 1500 | 650 | — | — |
| | 5 | 1000 | — | — | — |
| 6 GPM | 2 | — | 4400 | 2250 | 1600 |
| | 2.5 | — | 2200 | 1300 | 900 |
| | 3 | 4000 | 1900 | 1000 | 650 |
| | 4 | 2400 | 1000 | 550 | — |
| | 5 | 1400 | 650 | — | — |
| | 6 | 1000 | 450 | — | — |

TABLE 2

| Nozzle Orifice Size | Hole size | | 500 PSI | 600 PSI | 700 PSI | 800 PSI | 1000 PSI | 1500 PSI | 2000 PSI | 2500 PSI | 3000 PSI | 3500 PSI |
|---|---|---|---|---|---|---|---|---|---|---|---|---|
| | .034"/ 0.86 mm | GALLONS PER | .71 | .77 | .84 | .89 | 1.0 | 1.2 | 1.4 | 1.6 | 1.7 | 1.9 |
| 2.5 | .042"/ 1.07 mm | MINUTE | .9 | 1.0 | 1.0 | 1.1 | 1.3 | 1.6 | 1.8 | 2.0 | 2.2 | 2.3 |
| 3.0 | .043"/ 1.09 mm | | 1.1 | 1.2 | 1.3 | 1.4 | 1.5 | 1.8 | 2.1 | 2.4 | 2.6 | 2.8 |
| 3.5 | .048"/ 1.22 mm | | 1.3 | 1.4 | 1.5 | 1.6 | 1.8 | 2.2 | 2.5 | 2.8 | 3.1 | 3.3 |
| 4.0 | .052"/ 1.32 mm | | 1.4 | 1.6 | 1.7 | 1.8 | 2.0 | 2.5 | 2.8 | 3.2 | 3.5 | 3.7 |
| 4.5 | .055"/ 1.40 mm | | 1.6 | 1.7 | 1.9 | 2.0 | 2.3 | 2.8 | 3.2 | 3.6 | 3.9 | 4.2 |
| 5.0 | .057"/ 1.45 mm | | 1.8 | 1.9 | 2.1 | 2.2 | 2.5 | 3.1 | 3.5 | 4.0 | 4.3 | 4.7 |
| 5.5 | .060"/ 1.52 mm | | 1.9 | 2.1 | 2.3 | 2.5 | 2.8 | 3.4 | 3.9 | 4.3 | 4.8 | 5.1 |
| 6.0 | .062"/ 1.57 mm | | 2.1 | 2.3 | 2.5 | 2.7 | 3.0 | 3.7 | 4.2 | 4.7 | 5.2 | 5.6 |

TABLE 2-continued

| Nozzle Orifice Size | Hole size | 500 PSI | 600 PSI | 700 PSI | 800 PSI | 1000 PSI | 1500 PSI | 2000 PSI | 2500 PSI | 3000 PSI | 3500 PSI |
|---|---|---|---|---|---|---|---|---|---|---|---|
| 6.5 | .064"/ 1.63 mm | 2.3 | 2.5 | 2.7 | 2.9 | 3.3 | 4.0 | 4.6 | 5.1 | 5.6 | 6.1 |
| 7.0 | .067"/ 1.70 mm | 2.5 | 2.7 | 2.9 | 3.1 | 3.5 | 4.3 | 4.9 | 5.5 | 6.1 | 6.5 |

Pounds Per Square Inch = PSI

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
   mobile equipment that defines an enclosed area in which one more of dirt, dust, and contaminants accumulate during use;
   a manifold mounted in the enclosed area;
   a plurality of pressure washer water nozzles that are connected to the manifold and each directed to spray water to dislodge dirt, dust, and contaminants that have accumulated in the enclosed area during use; and
   a pressurized water supply line connected to the manifold, in which the pressurized water supply line has a water supply connector inlet that is structured to connect to an external water fluid supply.

2. The apparatus of claim 1 further comprising a pump connected to supply water to the pressurized water supply line.

3. The apparatus of claim 2 further comprising a water supply connected to the pressurized water supply line.

4. The apparatus of claim 1 in which the water supply connector inlet comprises a quick-connect fitting.

5. The apparatus of claim 1 in which the water supply connector inlet is mounted to the mobile equipment external to the mobile equipment.

6. The apparatus of claim 1 in which the manifold is connected to supply water to the plurality of pressure washer water nozzles in parallel or in series.

7. The apparatus of claim 1 further comprising a plurality of manifolds, each having a plurality of pressure washer water nozzles, and each connected to the pressurized water supply line.

8. The apparatus of claim 7 in which:
   the mobile equipment defines a plurality of enclosed areas; and
   each of the plurality of enclosed areas contains one or more of the plurality of manifolds and respective plurality of pressure washer water nozzles.

9. The apparatus of claim 1 in which the enclosed area is accessible by one or more of guarding, panels, or seats.

10. The apparatus of claim 1 in which the mobile equipment comprises a loader or lifter.

11. The apparatus of claim 1 in which one or more of the manifold, the plurality of pressure washer water nozzles, and the pressurized water supply line comprise metal.

12. The apparatus of claim 1 in which the manifold is connected to the enclosed area using tube clamps.

13. The apparatus of claim 1 in which the manifold is connected to the enclosed area using magnets.

14. The apparatus of claim 1 in which the pressurized water supply line comprises a fluid filter.

15. The apparatus of claim 1 in which the enclosed area comprises an engine compartment, and the plurality of water pressure washer nozzles are directed to the engine.

16. The apparatus of claim 1 in which the enclosed area is within a doghouse or cab of the mobile equipment.

17. The apparatus of claim 1 in which the enclosed area comprises a compartment located below a seat of the mobile equipment.

18. The apparatus of claim 1 in which the plurality of water pressure washer nozzles have an orifice diameter of 0.067" or less.

19. The apparatus of claim 18 in which the plurality of water pressure washer nozzles have an orifice diameter of 0.034" or less.

20. A wash system for mobile equipment comprising:
   a manifold;
   a plurality of pressure washer water nozzles;
   a pressurized washer water supply line; and
   a quick-connect fitting inlet on the pressurized washer water supply line for connection to an external water supply;
   in which the manifold and plurality of pressure washer water nozzles comprise enclosed area mounting parts and are structured to mount within an enclosed area of the mobile equipment where dirt, dust, and contaminants accumulate during use of the mobile equipment.

* * * * *